Dec. 31, 1963     E. A. ROBERTS     3,115,919

TIRE TREAD

Filed April 27, 1962     4 Sheets-Sheet 3

INVENTOR
EUGENE A. ROBERTS
BY *Steward & Steward*
his ATTORNEYS.

United States Patent Office 3,115,919
Patented Dec. 31, 1963

3,115,919
TIRE TREAD
Eugene A. Roberts, Hamden, Conn., assignor to The Armstrong Rubber Company, West Haven, Conn., a corporation of Connecticut
Filed Apr. 27, 1962, Ser. No. 190,684
8 Claims. (Cl. 152—209)

This invention relates to pneumatic tires for vehicles, and it relates more particularly to improvements in the construction and arrangement of traction-elements in the non-skid tread portion of the tire.

For many years most passenger tires have been provided with non-skid treads which consist essentially of several ribs—usually five to eight—extending circumferentially of the tire. The purpose of such ribbed designs has been primarily to provide even tread wear and quietness. However, with the increase in the speed of automobiles, heavier loads are being placed on the tires, resulting in some instability in the conventional so-called ribbed tires, and this has caused greater wear in the shoulder ribs because of the high lateral stress placed on the portions of the tread near the shoulders.

Attempts have been made to overcome these difficulties by using transverse grooves, that is, groves which run either obliquely or straight across the thread, in place of the circumferential grooves which form the ribs. However, as evidenced by the well-known mud-and-snow tires which employ this type of tread, tread-wear is much more rapid where the groves extend to the outer edges or shoulder portions of the tread. Consequently, in standard passenger tires (i.e. those other than mud-and-snow tires), the transverse grooves necessarily must start and stop within the tread area in order to prevent undue tread-wear. In other words for standard passenger tires where maximum mileage is expected, transverse grooves can not extend to and open outwardly at the shoulders of the tire, as in the case of snow tires in which long wear is not expected. Transverse grooves which do not extend to the shoulders or open into circumferential grooves are commonly referred to as closed grooves because they are closed at both ends. A closed groove, moreover, will at one point in the rotation of the tire be located wholly within the area of actual contract with the road surface, completely cut off from the atmosphere. As pointed out in the book "Pneumatic Tyre Design" by E. C. Wood (W. Heffer & Sons Ltd., Cambridge, England, 1952) closed grooves or "pockets" as they are frequently referred to in the industry, have been almost universally avoided by tire makers, because they give rise to what is commonly known as pocket noise. Nevertheless closed grooves greatly improve the stability of the tread and provided uniform wear across the tread surface, but because they cause so much noise they have not been used theretofore in tires in which absence of noise is an important factor.

Pocket noise is caused by the closing off of individual grooves or slots within the contact areas of the tread with the road surface and of the simultaneous distortion of the tire in that area, which decreases the volume of the slots and compresses the air within them, causing it to escape under considerable pressure. Then as these grooves rotate out of contact with the road and the adjacent portion of the tire returns to its normal shape, a suction-cup type of vacuum is created. The compression and vacuum effect of the closed grooves results in an unpleasant and highly undesirable hissing noise at virtually all speeds of operation.

Closed transverse grooves can not be connected by means for grooves which extend circumferentially or obliquely of the tread in order to vent the entrapped air to other parts of the tread outside the contact area, because this forms lugs in the tread which wear rapidly and subject the tread to cupping, as well as heel-and-toe wear. Furthermore, such tread lugs also cause noise like that produced by snow tires. Attempts to connect transverse grooves by means of narrow slits in the tread, commonly referred to now as sipes, have likewise been unsuccessful, because the width of the sipes is so small that they close up within the contact area of the tread under the forces of deflection and roll on the tread in that area. Consequently, such connecting sipes do not vent the closed grooves in the critical contact area of the tread.

The object, therefore, of the present invention is to provide means by which closed grooves or pockets in the tire tread can be vented to prevent undesirable noise cause by air entrapped therein.

This problem is solved in accordance with the invention by novel means for venting each of the pockets or closed grooves without adversely affecting any other property of the tire, such as wear. This is accomplished by providing special sipes or very narrow slots or slits from each pocket to a vented portion of the tire, each of said sipes having in intimate association with it a subsurface passage which extends the full length of the sipe. Thus, each pocket is permitted to "breath," so to speak, through the passages which are formed in conjunction with the sipes and which provide free communication with an exposed portion of the tread. Of course, the only time a pocket in the tread surface needs to be vented is when it is entirely within the area of the tread which is in contact with the road. Therefore, if each pocket is vented by means of these special sipes when the tread surrounding it is subjected to the forces exerted on it while in contact with the road, air can not be trapped in any of the pockets, thus eliminating the undesired noise which has heretofore rendered tires of this general design unsuitable commercially. Accordingly, the invention resides primarily in the development and proper application of a novel sipe, the width of which at the tread surface is such that it readily closes under pressure in the usual manner, but which forms below the tread surface a passage large enough so that it can not close under deflection of the tire. By interconnecting the pockets or closed grooves in the tread in any of a number of different ways with vented parts of the tread by means of such sipes, all the suction-creating pockets in the tread can be vented in order to prevent noise caused by such action.

The invention will be more apparent from the following description and accompanying drawings, which provide specific examples for the purpose of illustrating different ways in which the invention may be satisfactorily carried out.

Figure 1:
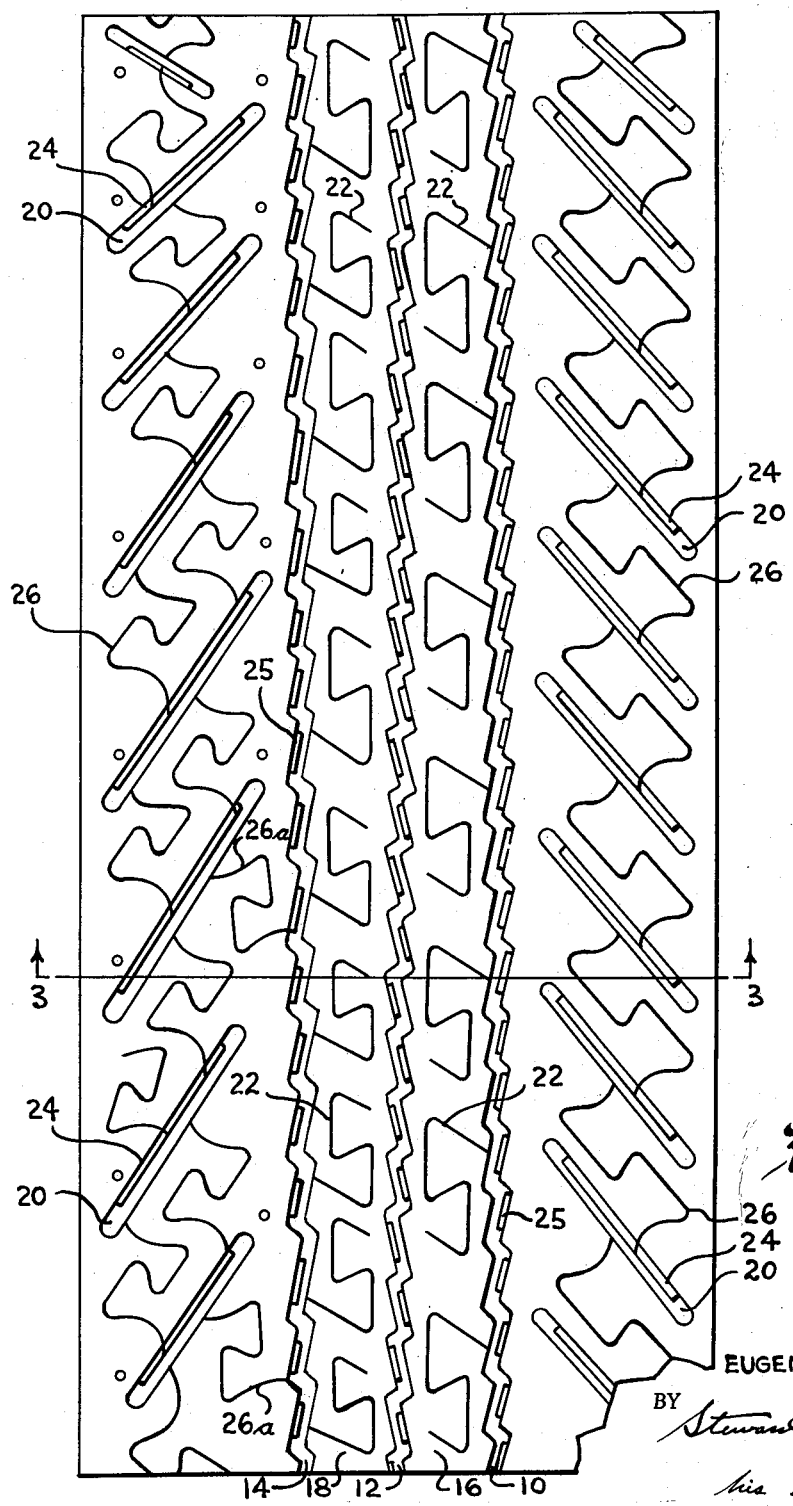
FIGS. 1 and 2 are views of a developed tread plan showing two sections of a tire tread embodying the invention.

Referring to the drawings, and more particularly to FIG. 1, the tread is desirably provided near its center with one or more grooves which extend circumferentially of the tire. In order to increase traction, the edges of these grooves may be saw-tooth shaped as shown, or they may be any of various other configurations commonly employed. Furthermore, the size of the traction elements formed along the edges of the grooves may vary in well-known ways to keep the noise level of the tire down. In the specific designs shown in FIGS. 1 to 3, three circumferential grooves 10, 12 and 14 are located in the central part of the tread with the middle groove 12 located on the center line of the tire. It will be understood, however, that a larger or smaller number of circumferential grooves could be used. On the other hand, no circumferential grooves need be employed, but the provision of circumferential grooves in the central part of the tread provides certain advantages which will become more apparent hereinafter.

Circumferential grooves 10, 12 and 14 form circumferentially extending ribs 16 and 18 similar to those found in the usual rib-type of tread. However, in the present construction no circumferential grooves are located outwardly of grooves 10 and 14 to the shoulder of the tire where instability of the tread has been found to be the cause of undue tread-wear. Instead of providing one or more additional circumferential grooves in these shoulder areas, therefore, as has been customary for many years, a series of transverse or obliquely extending grooves 20 are formed at more or less regular intervals circumferentially of the tire. As will be seen in FIGS. 1 and 2, transverse grooves 20 extend at various angles to the center line of the tread and are of different lengths in accordance with the principles developed heretofore for reducing noise as disclosed in the patents to Buddenhagen 2,612,928 and Buddenhagen and Roberts 2,808,867.

In addition and also in accordance with the noise-reducing principles disclosed in the above-mentioned patents, the lengths of grooves 20 may vary from groove to groove and more particularly in groups from one section of the tire to the next. The difference between the length of the grooves and tread-elements along the edges of the ribs is most readily apparent from the drawings by comparing the left side of the tread section shown in FIG. 2 with the right side of the section shown in FIG. 1, these two sections being typical of those making up the tread of the tire, each section shown being in this instance one-eighth of the circumference of the tire. The central ribs 16, 18 are desirably provided with S-shaped sipes 22 forming interlocking tread-portions in ribs 16 and 18 in accordance with the patent to Walsh 2,690,202.

Figure 2:
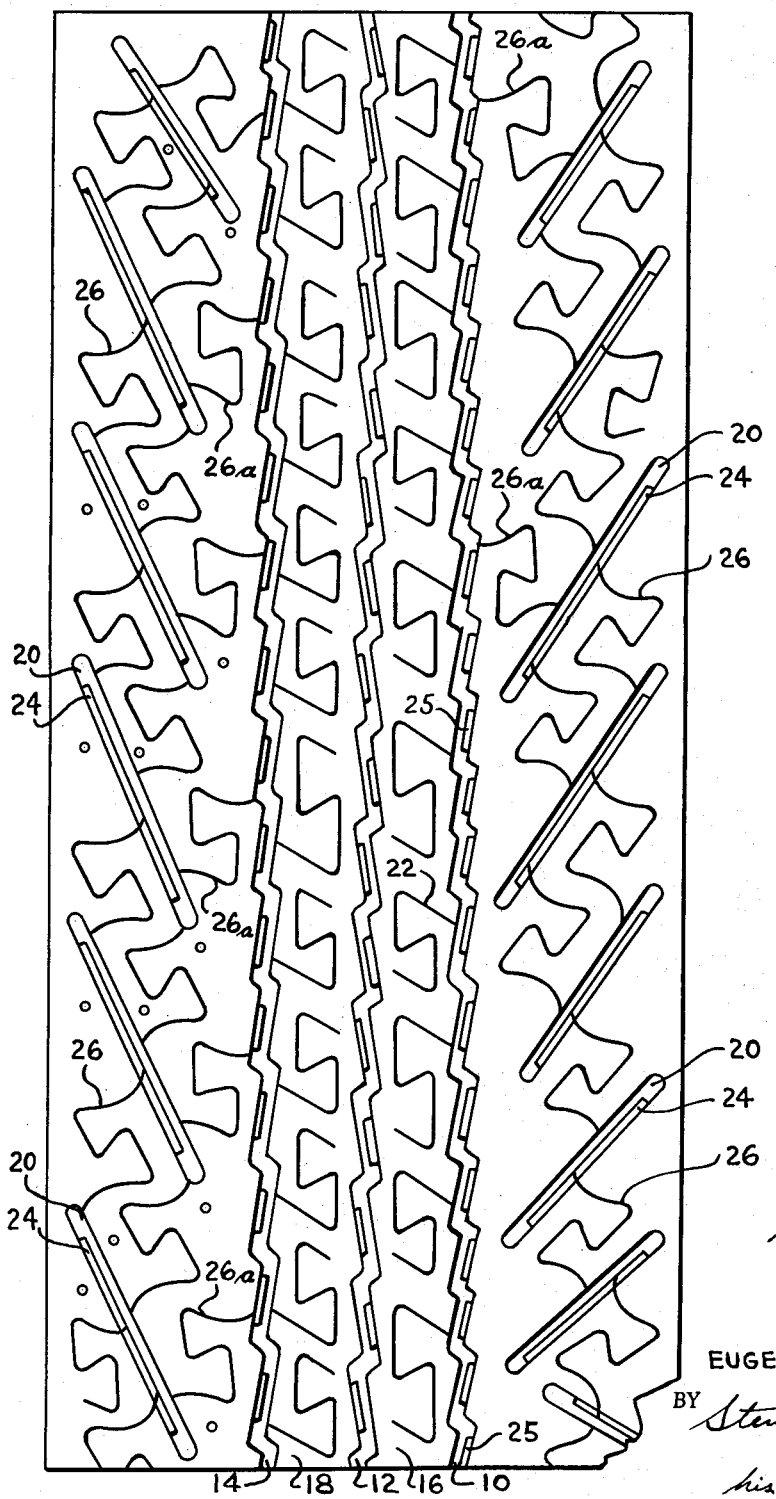
Figure 3:
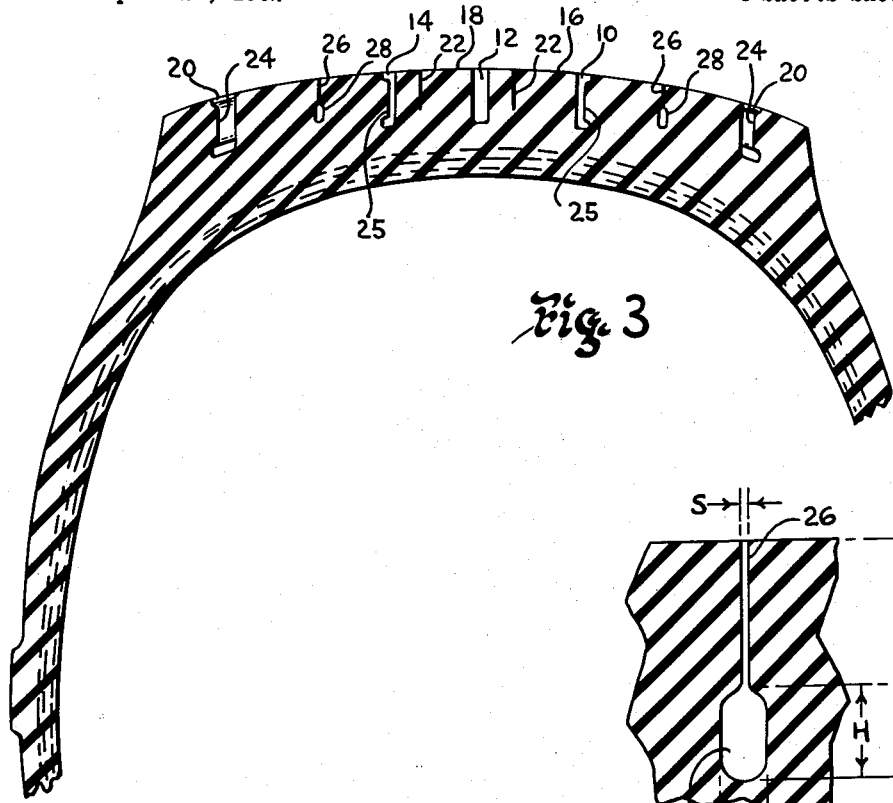
FIG. 3 is a more or less schematic cross-section of the tire, taken on the line 3—3 of FIG. 1 and shown partially broken away.

As may be seen in FIGS. 1 to 3, the transverse grooves 20 in the shoulder portions of the tread are each provided with lateral protuberances 24 in one wall of the groove below the tread surface in order to prevent closing of grooves 20 at the tread surface under extraordinary stresses on the tread due to high-speed turns or braking of the vehicle. Protuberances 24 are shown in FIGS. 1 and 2 as extending continuously along a major portion of each groove 20 but terminating short of both ends of each groove. However, it will be understood that such protuberances can if desired, be in the form of interrupted lugs, such as the lugs 25 in the circumferential grooves 10, 12 and 14 in accordance with the patent to Walsh 2,661,041.

Each of grooves 20 is intersected by one or more narrow slots 26, which in this particular instance are similar in shape and width at the surface of the tread to the sipes 22 at the center of the tread. As may be clearly seen in FIG. 4, all the slots 26 have, in intimate association therewith, passages 28 formed at the base of each slot and extending the full length thereof. Passages 28 interconnect grooves 20 so that air can pass freely from one groove to the next. In this way all the grooves 20 in the portion of the tread in contact with the road are vented, so that no suction pockets are formed. While in the embodiment of the invention shown in FIGS. 1 and 2, each of the closed grooves 20 is connected with another by one or more slots 26 having vent passages 28, the grooves 20 can, where necessary, be vented to one or the other of circumferential slot 10 or 14, as illustrated for example, by the sipes 26a. Due to the size of the closed grooves 20 in this particular case, each is vented by at least two of the venting sipes 26 or 26a and in some cases by as many as five such sipes interconnecting the closed grooves with each other and/or with a circumferential groove.

Slots 26, 26a and the passages 28 associated therewith may be considered as a special type of sipe which can be formed in the tire tread by means of thin metal fins in the tire mold in the same manner that conventional sipes are provided.

In carrying out the invention in a tread for a size 8:50–14 tire, the following dimensions for the venting sipes have been found to be suitable: The over-all depth D (FIG. 4) of a venting sipe may be about 0.32 to 0.44 inch and the thickness S of the slot 26 about 0.015 inch, while the thickness W of the enlarged passage 28 at the base of each sipe is desirably on the order of 0.066 inch. In other words, in this particular example the passage 28 is somewhat more than four times the thickness of the outer narrow slot 26 of the sipe. However, it is presently contemplated that the thickness of the passage 28 may be from two to eight times the thickness of the slot 26 of the thread surface. The principal criterion in any event is that the slot 26 be narrow enough to close up under normal loading while the passage 28 is of such width that it cannot close under deflection and running action of the tire.

The vertical dimension H of the passage is desirably about 0.14 inch, or less than half the over-all depth D of the venting sipe. As a general rule the passage 28 will comprise about one third of the over-all depth of the venting sipe. The depth of the sipes is preferably somewhat less than the depth of the grooves 10, 12, 14 or 20, which may be in this particular example on the order of 0.038 to 0.045 inch in depth and 0.120 inch in width. It will be understood of course that the foregoing dimensions are purely illustrative and are presented for the purpose of indicating the relative proportions of the venting passage with respect to the width and depth of the narrow slots or sipes, as well as the difference between the width of the transverse and circumferential grooves with respect to the width of the sipes.

Figure 4:
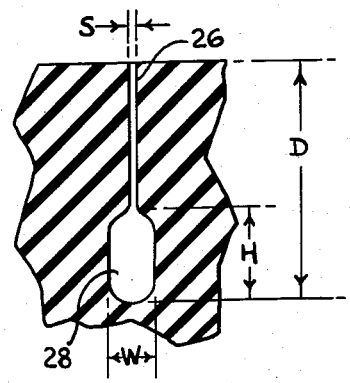
FIG. 4 is an enlarged detail view in section, showing the formation of a breathing passage in conjunction with the sipes which connect the closed grooves with vented portions of the tire.
Figure 5:
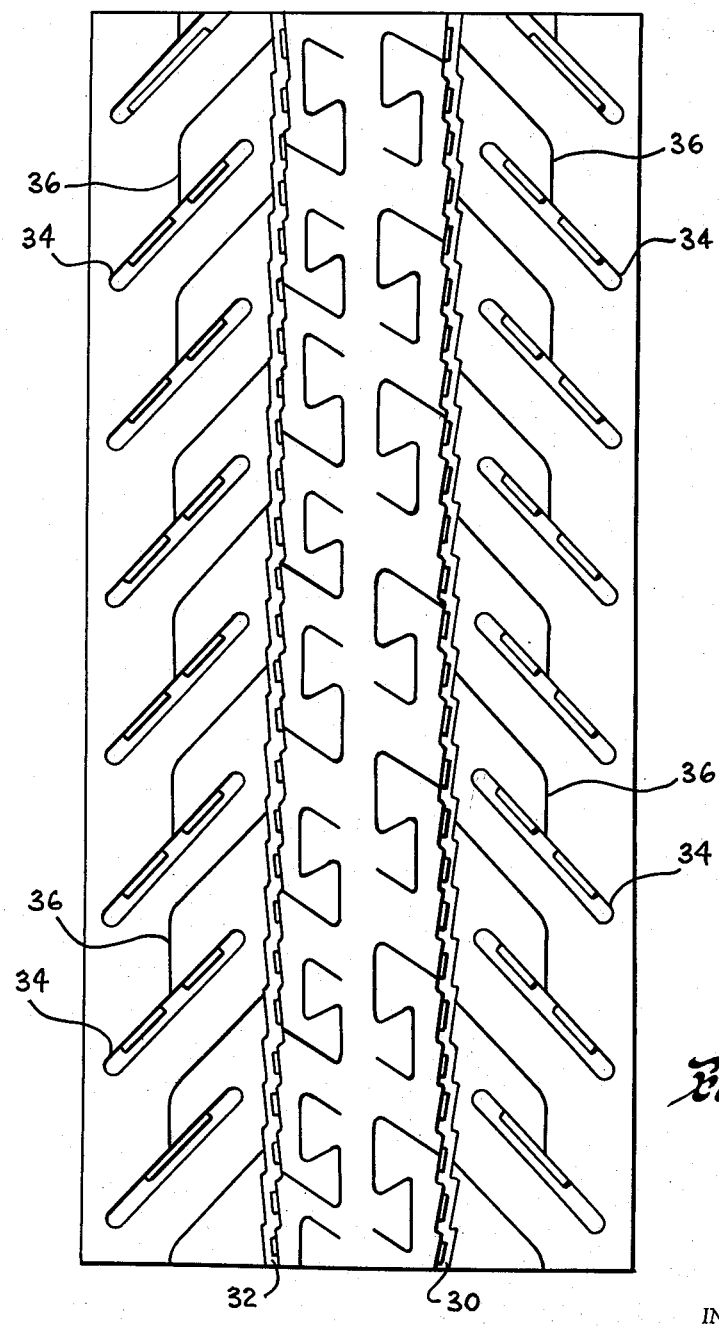

Referring now to the modification shown in FIG. 5, it will be noted that only two circumferential grooves 30, 32 are provided adjacent the center line of the tread and that each of the transverse grooves or pockets 34, located in the so-called shoulder area of the tread, is vented to one or the other of the circumferential grooves 30, 32 by means of venting sipes 36 like that shown in FIG. 4. In this case sipes 36 have only a single bend instead of being S-shaped like the venting sipes 26, 26a of FIGS. 1 and 2. Moreover, where the closed grooves 34 are sufficiently small, they may be vented by a single venting sipe 36. It is to be understood, therefore, that while the closed grooves or pockets in the tread design shown in FIGS. 1 and 2 are vented by means of two or more venting sipes, only a single venting sipe need be employed for each pocket if the pockets are small. Conversely, the pockets 34 of the design shown in FIG. 5 could be vented with more than one venting sipe and in fact would be so vented in cases where the grooves or pockets are large. Furthermore, venting sipes may be employed in this design to interconnect the grooves 34 directly with each other by using sipes in addition to or in place of the ones shown.

Figure 6:
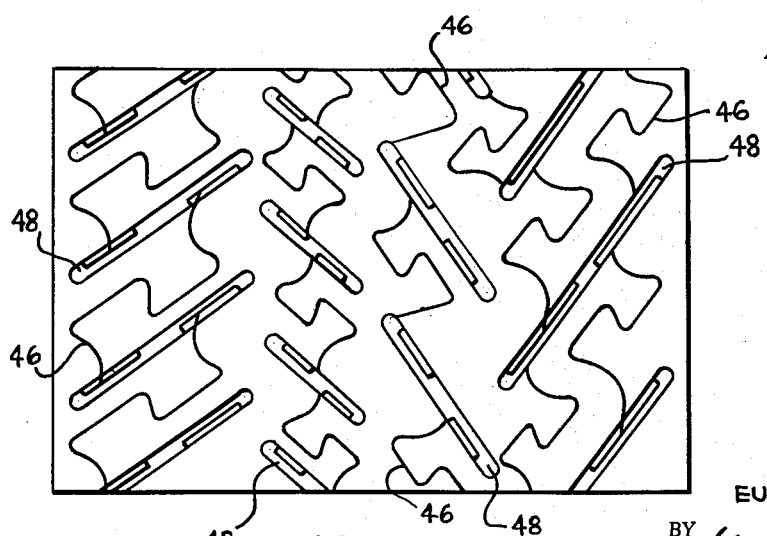
FIGS. 5 and 6 are modified tread plans in which the invention may be employed to good advantage.

FIG. 6 shows another tread design employing venting sipes 46 formed in accordance with the invention. In this case, no circumferential grooves are provided in the tire, the primary traction elements being the angularly disposed closed grooves 48 which are positioned both circumferentially and transversely of each other in the tread. Venting sipes 46 are so arranged that each of the closed grooves 48 is vented to another groove 48 located circumferentially of it, such that each groove within the road engaging portions of the tread is vented to an open part of the tread either directly by a venting sipe 46 or indirectly through a succession of grooves 48 and sipes 46.

It will be understood of course that while venting sipes 26, 26a 36 and 46 may be of any desired shape in their longitudinal extent, they are all alike in that each is provided with an enlarged subsurface passage extending the full length of the sipe, which is capable of conducting fluid from one part of the tread to another even under severe stresses to which the tire may be subjected while in use. As a general rule, however, in order to provide a tread with a uniform appearance, it is customary for each tire to use sipes of the same basic configuration longitudinally.

What is claimed is:

1. In a pneumatic tire having a tread of rubber-like material, a non-skid tread construction comprising in combination:
   (a) a plurality of pockets in said tread, certain of said pockets being spaced circumferentially of each other,
   (b) a plurality of venting sipes interconnecting said pockets such that each of said pockets is vented to a portion of said tread disposed circumferentially thereof, and
   (c) a passage formed below the surface of the tread in intimate association with, and comprising a part of, each of said venting sipes, said passage extending the full length of said sipe,
   (d) the cross-section of each of said passages being such that it is not closed by the deflection and running action of the tire, whereby each of said pockets is always in free communication with an exposed portion of the tread surface when the tire is in use.

2. A tread construction as defined in claim 1, wherein said pockets comprise transverse grooves closed at both ends.

3. A tread construction as defined in claim 1, which further includes at least one circumferential groove in the central portion of said tread and at least some of said pockets are connected to said circumferential groove by means of said venting sipes.

4. In a pneumatic tire having a tread of rubber-like material, a non-skid tread construction comprising:
   (a) a plurality of grooves extending transversely of said tread, certain of said transverse grooves being spaced circumferentially of each other,
   (b) each of said transverse grooves being closed at both ends,
   (c) at least one circumferential groove being formed in the central portion of said tread,
   (d) a plurality of venting sipes intersecting said transverse grooves, with certain of said sipes also intersecting a said circumferential groove,
   (e) a passage formed below the surface of the tread in intimate association with and comprising a part of each of said venting sipes, said passage extending the full length of said sipe,
   (f) the cross-section of each of said passages being such that it is not closed by the deflection and running action of the tire,
   (g) each of said transverse grooves being connected by at least one of said venting sipes with an exposed portion of said tread when it is in contact with the road, whereby each of said transverse grooves is always vented when the tire is in use.

5. A tread construction as defined in claim 4, wherein certain of said venting sipes interconnect said transverse grooves with other transverse grooves disposed circumferentially thereof.

6. A tread construction as defined in claim 4, wherein the width of said passages is from two to eight times the width of the sipes at the tread surface.

7. In a pneumatic tire having a tread of rubber-like material, a non-skid tread construction comprising:
   (a) a plurality of grooves extending transversely of said tread with certain of said grooves spaced circumferentially of each other,
   (b) each of said grooves being closed at both ends,
   (c) at least one circumferential groove in the central portion of said tread,
   (d) a plurality of venting sipes interconnecting at least some of said transverse grooves with a said circumferential groove,
   (e) each of said venting sipes having a passage formed below the surface of the tread and comprising about one third the depth of said sipe, said passage extending the full length of said sipe,
   (f) the cross-section of each of said passages being such that it is not closed by the deflection and running action of the tire, whereby each of said transverse grooves is always in free communication with an exposed portion of the tread surface when the tire is in use.

8. A tread construction as defined in claim 7, wherein the width of said passages is about four times the width of said sipes at the thread surface.

References Cited in the file of this patent

UNITED STATES PATENTS

| | | |
|---|---|---|
| 2,121,955 | Eger | June 28, 1938 |
| 2,575,439 | Billingsley | Nov. 20, 1951 |

FOREIGN PATENTS

| | | |
|---|---|---|
| 751,641 | Great Britain | July 4, 1956 |